United States Patent
Kaushik

(10) Patent No.: US 10,966,131 B2
(45) Date of Patent: Mar. 30, 2021

(54) RELIABLE CALL HAND-OFF FROM CELLULAR NETWORKS TO WI-FI NETWORKS

(71) Applicant: MERU NETWORKS, Sunnyvale, CA (US)

(72) Inventor: Anil Kaushik, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 173 days.

(21) Appl. No.: 15/086,023

(22) Filed: Mar. 30, 2016

(65) Prior Publication Data

US 2017/0289885 A1    Oct. 5, 2017

(51) Int. Cl.
| | | |
|---|---|---|
| H04W 36/18 | (2009.01) | |
| H04W 36/00 | (2009.01) | |
| H04W 36/14 | (2009.01) | |
| H04M 7/00 | (2006.01) | |
| H04W 88/06 | (2009.01) | |

(52) U.S. Cl.
CPC .......... *H04W 36/18* (2013.01); *H04M 7/006* (2013.01); *H04W 36/0022* (2013.01); *H04W 36/14* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2015/0237552 A1* | 8/2015 | White | ............... | H04W 36/0085 370/331 |
| 2017/0019819 A1* | 1/2017 | Yang | .................... | H04B 7/1855 |
| 2017/0223597 A1* | 8/2017 | Telang | .................. | H04W 36/24 |

* cited by examiner

*Primary Examiner* — Adnan Baig
(74) *Attorney, Agent, or Firm* — Law Office Of Dorian Cartwright; Dorian Cartwright

(57) ABSTRACT

Reliable call hand-offs from a cellular network to a Wi-Fi network. A hand-off controller detects a hand-off condition (e.g., hand-off request, potential/predicted hand-off request) and, in response, initiates a test call. For example, a telephone call made through a smart phone, using a cellular network (e.g., Verizon, AT&T or Sprint) can be handed over to a hot spot at a Starbucks. In response to detecting an available data network, transmission quality for VOIP conditions is automatically tested. If the network conditions meet a certain predetermined threshold, the VOIP hand-off is executed. If the predetermined threshold is not met, the VOIP hand-off may not be executed, or may be delayed.

19 Claims, 6 Drawing Sheets

RELIABLE CALL HAND-OFF FROM CELLULAR NETWORKS TO WI-FI NETWORKS

FIELD OF THE INVENTION

The invention relates generally to Wi-Fi computer networking, and more specifically, to transferring calls between a cellular network to a Wi-Fi network at a specified quality.

BACKGROUND

The advancement of VOIP technology allows mobile devices to move bandwidth from voice networks, such as GSM/CDMA/LTE to Wi-Fi portions of data communication networks. Traditionally, voice calls were conducted completely over voice networks. However, VOIP calls, bolstered in part by faster, more reliable, networks, are being utilized more and more to handle voice calls. Free hot spots and unlimited data plans make data voice calls an attractive alternative to the tolled cellular networks.

Currently available applications for switching to a data network require manual intervention. Once an access point of a sufficient RSSI is identified, a hand-over can be initiated. Problematically, the reliability of some data networks can be low, due to network congestion, time of day, and various other factors. Network reliability can change over time as network conditions change. Accordingly, it may not always be desirable to change networks during a single voice call.

What is needed is a robust technique for more reliable call hand-offs from cellular networks to Wi-Fi networks. The technique can use a test VOIP call, for quality control, prior to the hand-off from a cellular network to a data network.

SUMMARY

The above-mentioned shortcomings are addressed by the present disclosure of a hand-off control system for handing-off calls from a cellular network to a data network.

In one embodiment, a hand-off controller detects a hand-off condition (e.g., hand-off request, potential/predicted hand-off request) and, in response, initiates a test call. For example, a telephone call made through a smart phone, using a cellular network (e.g., Verizon, AT&T or Sprint) can be handed over to a hot spot at a Starbucks. In response to detecting an available data network, transmission quality for VOIP conditions is automatically tested. Network conditions are measured during a test VOIP call (e.g., latency, error rate, network congestion, packet collisions, processor load, queue capacity, storage capacity, and periodic goals). If the network conditions meet a certain predetermined threshold, the VOIP hand-off is executed.

If the predetermined threshold is not met, the VOIP hand-off may not be executed, or may be delayed. In an embodiment, a new server or service is tested responsive to a previous server or service failing to meet the predetermined threshold.

Advantageously, reliability is increased when handing-off from a cellular network to a data network.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Hand-off control systems, computer-implemented methods, and (non-transitory) computer-readable mediums for handing-off calls from a cellular network to a data network, are described. Hand-offs are generally referred to herein as moving from cellular networks to data networks, however, hand-off can also occur in the opposite direction.

Figure 1A:
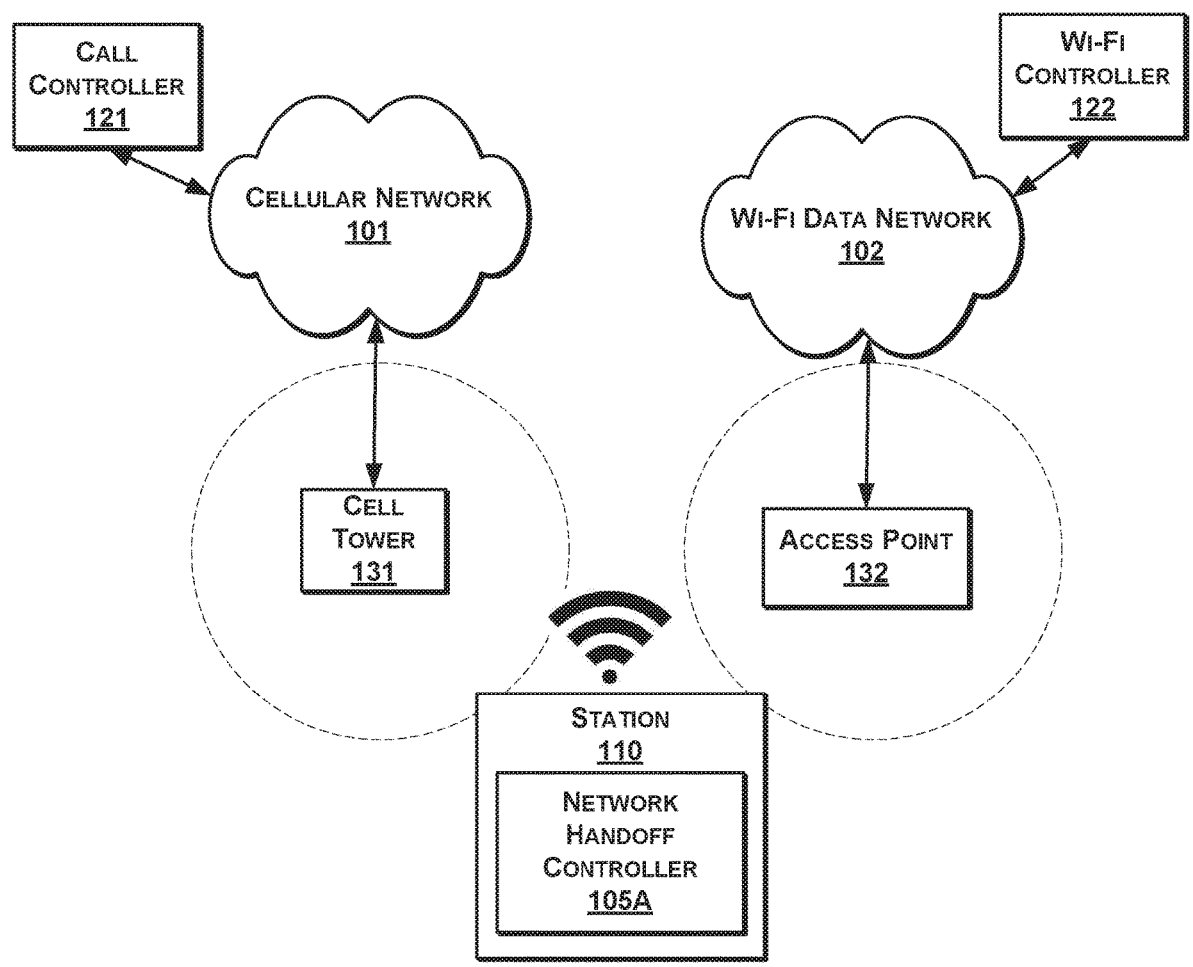
FIG. 1A is a block diagram illustrating a hand-off control system, based in a station making a call, for handing-off calls from a cellular network to a data network, according to an embodiment.
Figure 1B:
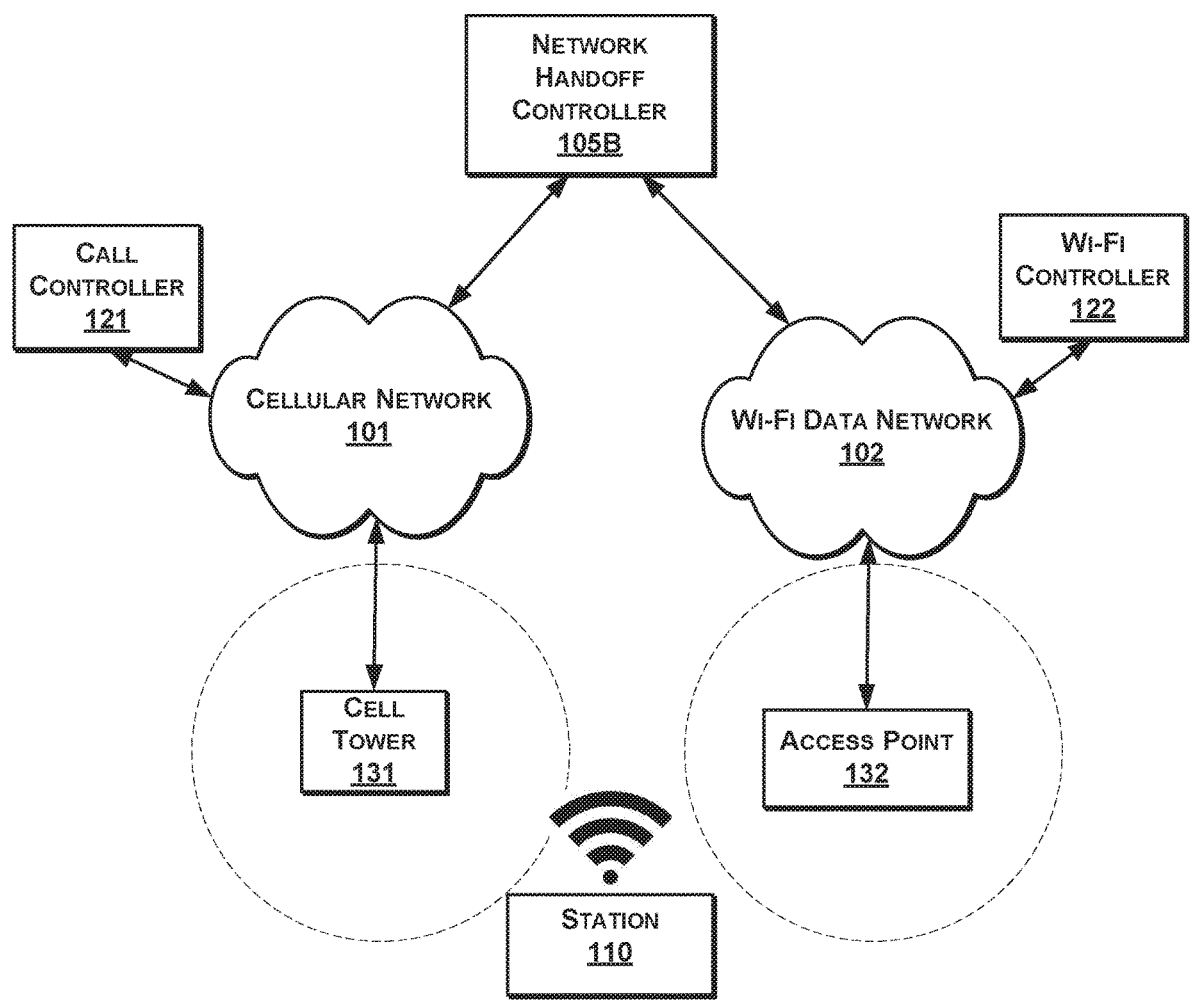
FIG. 1B is a block diagram illustrating a hand-off control system, based in a network, for handing-off calls from a cellular network to a data network, according to an embodiment.
Figure 2:
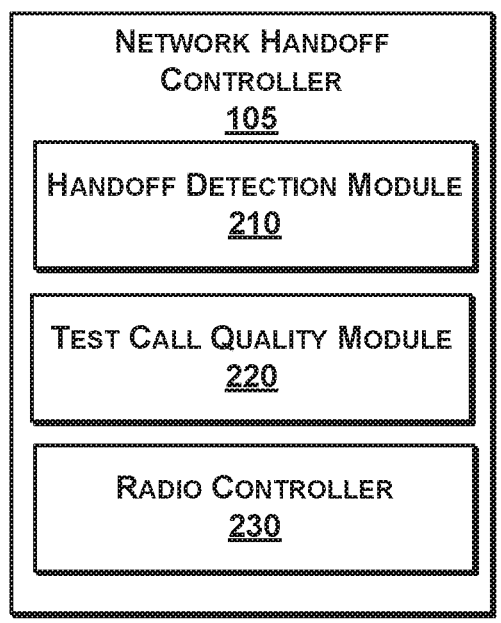
FIG. 2 is a more detailed block diagram illustrating a hand-off controller of FIG. 1, according to an embodiment.

Systems for Reliable Network Hand-Offs (FIG. 1-2)

FIG. 1A is a block diagram illustrating a hand-off control system 100 for handing-off calls from a cellular network 101 to a data network 102, according to an embodiment. The system 100 comprises a network hand-off controller 105 and a station 110, communicatively coupled through the backbone infrastructure. A call controller 121 and a cell tower 131 are communicatively coupled to the cellular network 101. A Wi-Fi controller 122 and an access points 132 are communicatively coupled to the Wi-Fi data network 102. The station 110 is within radio range of both the cell tower 131 and the access point 132. Additional network components can also be part of the system 100, such as firewalls, virus scanners, routers, switches, application servers, databases, as well as additional controllers, access points, access switches, stations, and the like. For instance, embodiments of the system 100 can be implemented in conjunction with a network security system, for example, the FortiGate Network Security platform by Fortinet of Sunnyvale, Calif. The network components can be implemented as hardware, software, or a combination of both.

Wireless components preferably use communication protocols such as IEEE 802.11 n and IEEE 802.11 ac wave 2, in addition to other protocols such as other IEEE 802.11s, IEEE 802.3, Bluetooth, 3G and 4G. The enterprise network can serve, for example, a business enterprise, a hospital or system of hospital, school, building, a private network, or the like. The enterprise network 101 can provide access to a wide area network or the Internet in some embodiments. Alternatively, the enterprise network 101 can be distributed over the Internet, in other embodiments. A combination of wired and wireless devices can be connected, as well as only wireless devices or only wired devices. The enterprise network can be, for example, the Internet, a cellular network, a larger enterprise network to which the enterprise network is a smaller component of, or a combination of network types.

A network hand-off controller 105A can be implemented in the station 110. The network hand-off controller 105A starts off in communication with the cellular network 101 when a hand-off condition is detected. Additionally, the network hand-off controller 105A is in communication with the Wi-Fi data network 102 to test a VOIP call, and if the quality is high enough, permit a hand-off to occur. The hand-off condition can be, without limitation, an actual request for a hand-off originating with the station 110, a predicted hand-off based, for example, on a rate of movement for the station 110, a forced hand-of initiated by a network device, low quality of service, or a network policy. A policy can initiate a hand-off from a fee-based cellular network whenever a free Wi-Fi connection is available. Still another policy automatically hands-off when indoors, or when cellular quality drops. In another embodiment, an RSSI signal determines when a hand-off is possible and can be a network condition triggering the hand-off voice call.

However, additional analysis is first completed before the network hand-off controller 105A permits the hand-off. More specifically, hand-off conditions can include one or more of: quality of service, network policies, latency, error rate, network congestion, packet collisions, processor load, queue capacity, and storage capacity. In one case, an explicit hand-off request is intercepted and delayed until testing is complete. This additional analysis can be in addition to standard protocol actions for hand-offs.

The network hand-off controller 105A is a general representation of one or more devices and/or processes, implementing the hand-off. In one implementation, the network hand-off controller 105 is a single, centralized apparatus. In another implementation, a distributed architecture leverages clients on one or more of the station 110, the call controller 121, cell tower 131, the Wi-Fi controller 122, and the access point 132. One example of a network hand-off controller 105 is a GSM/Wi-Fi gateway. Detailed embodiments of components within the hand-off controller 105 are set forth below with respect to FIG. 3.

The station 110 places and receives voice calls using various types of networks. During a voice call, a user in motion can cause a hand-off of the station 110 between two different networks as one becomes more suitable for the new location. In an embodiment, the station 110 includes a cellular radio and a Wi-Fi radio on board. The station 110 can sense the Settings for hand-offs can be configured through a user interface of the station 110. The station 110 can be, for example, a personal computer, a laptop computer, a tablet computer, a smart phone, a mobile computing device, a server, a cloud-based device, a virtual device, an Internet appliance, or any of the computing devices described herein (see e.g., FIG. 5). No special client is needed for this particular technique, although other aspects of the network may require downloads to the station 110. The station 110 access, for example, a LAN (local area network) or external networks using an RF (radio frequency) antenna and network software complying with IEEE 802.11.

The access point 132 provides a connection for the station 110 to the Wi-Fi data network 102 to continue a voice call that has been handed-off. A BSSID is advertised to the station 110 through beacon frames, to facilitate an authorized connection from the station 110 to the access point 132. The access point 132 can also have additional processes for handling handed-off calls or VOIP calls.

Figure 5:
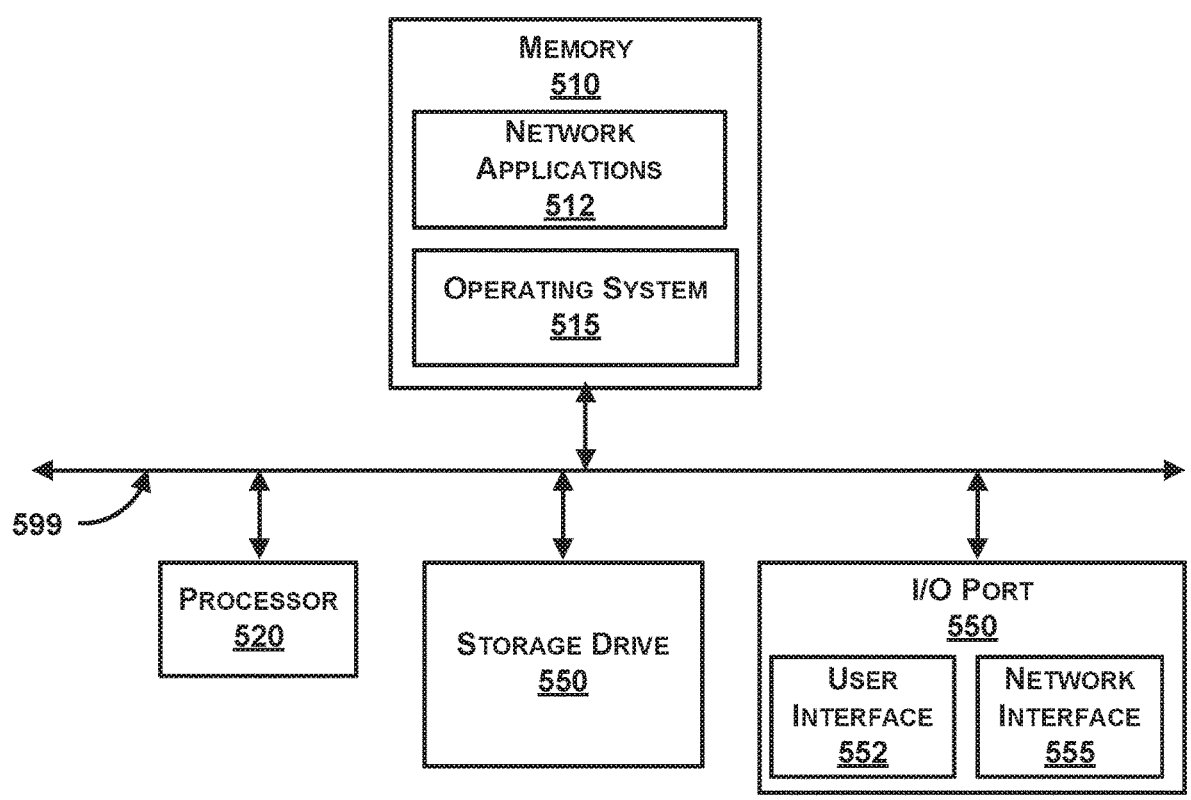
FIG. 5 is a block diagram illustrating an exemplary computing device, according to one embodiment.

Physically, the access point 132 include one or more individual access points implemented in any of the computing devices discussed herein (e.g., see FIG. 5). For example, the access point 132 can be an AP 110 or AP 433 (modified as discussed herein) by Meru Networks of Sunnyvale, Calif. A network administrator can strategically place the access point 132 for optimal coverage area over a locale. The access point 132 can, in turn, be connected to a wired hub, switch or router connected to the enterprise network (or an external network). In embodiment, access point functionality is incorporated into a switch or router. In another embodiment, the access point 132 is a virtual device.

The Wi-Fi controller 122 manages a group of access points on the Wi-Fi data network 102, including the access point 132. Internal hand-offs between access points within the Wi-Fi data network 102 can be initiated, assisted, or facilitated by the Wi-Fi controller 122.

Figure 3:
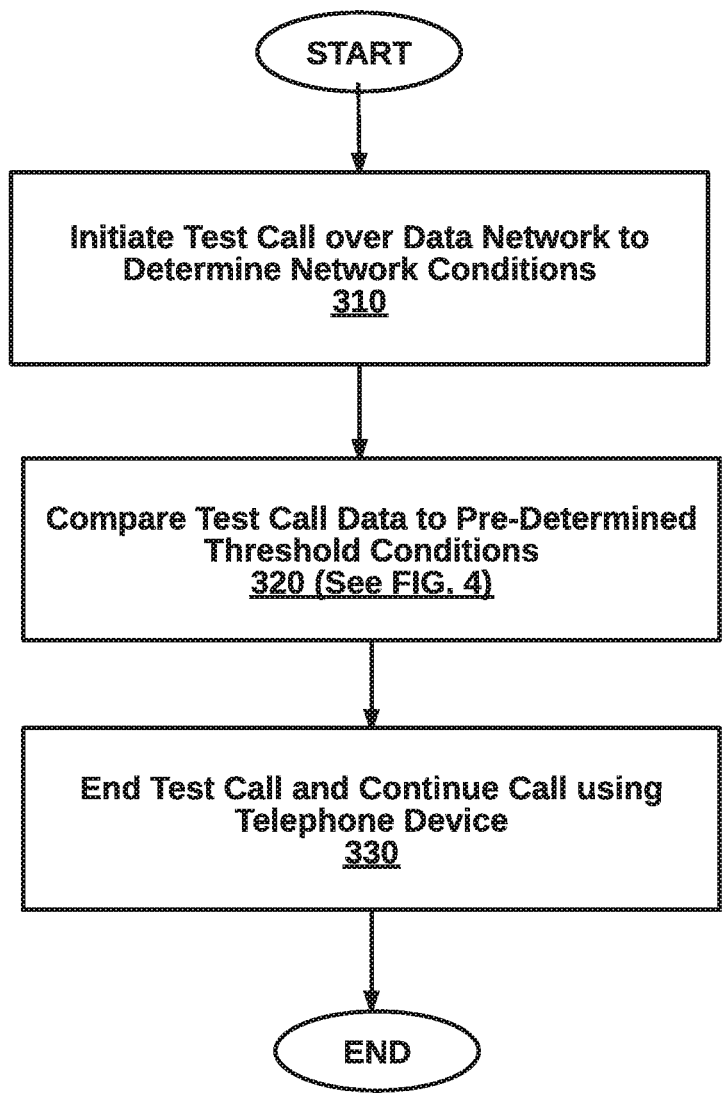
FIG. 3 is a flow chart illustrating a method for reliable VOIP hand-offs from cellular networks to Wi-Fi networks, according to an embodiment.

The Wi-Fi controller 122 can be implemented in any of the computing devices discussed herein (e.g., see FIG. 3). For example, the cloud-based Wi-Fi controller 122 can be an MC1500 or MC6000 device (e.g., modified) by Meru Networks of Sunnyvale, Calif. Additional functionalities of the Wi-Fi controller 110 include management of the access point 120. Further, virtual cell and virtual port services leverage the network-wide view of the system 100 available to the Wi-Fi controller 122.

The cellular call controller 121, in an embodiment, has a first module to control intra-network hand-offs of a call, for example, between cell towers. The cell tower 131 can have local processing and antennae modules for exchanging signals with the station 110 while within range.

In contrast to FIG. 1A in which the network hand-off controller 105A is implemented in the station 110, the network hand-off controller 105B of FIG. 1B is implemented as a network-based device. Similar components perform similar processes to generate the common result of making a test call prior to switching networks. In some embodiments, the station 110 (and other components) can have mobile apps for optimizing operations.

FIG. 2 is a more detailed block diagram of the network hand-off call controller 105 (representative of either 105A or 105B), according to an embodiment. The network hand-off controller 105A comprises a hand-off detection module 210, a test call quality module 220, and a radio controller 230. Many other configurations are possible.

The hand-off detection module 210 determines that a hand-off is being attempted or will be attempted. In the case of an attempt, a command to hand-off can be intercepted and temporarily delayed until allowed to go forward. In the case of a predicted attempt, the test call can be conducted before an actual attempt is made.

The test call quality module 220, in one embodiment, makes a new VOIP call using a new network, while the station 110 is still processes the existing call on the existing network. The test call operates in the background and can be without knowledge to a user of the station 110 and without the access point 132 knowing that the call is just a test versus an actual call. A standard telephone number can be used to facilitate the test call completely from the station 110. In other embodiments, the access point 132 can have local processes that assist the test call. For example, a certain telephone number can be used for test calls which the access point 132 recognizes. In some embodiments, a separate processor or a separate thread on a multi-threaded processor or a multi-threaded operating system can isolate computing resources for the concurrent calls, in some embodiments, to prevent loss of quality on the existing call.

The radio controller 230 executes hand-offs that are allowed to go forward by moving a voice data stream originating at higher layers from a cellular radio to a Wi-Fi radio. There can be some duplicity during the transfer over both radios until it is confirmed that the VOIP call is prepared. For example, a higher-layer voice application executing on the station 110 can send a digitized stream of voice data to the lower layers for sending through a communication channel. The radio controller 230 can set a bit to 0 or 1 indicating which communication channel to use. Following the cellular communication channel, a 3G or 4G radio can be accessed, while following the data communication channel, a Wi-Fi radio can be accessed. Before being transmitted over an RF antenna from the Wi-Fi radio, additional processes can take place, such as encoding, error checking, and the like.

Figure 4:
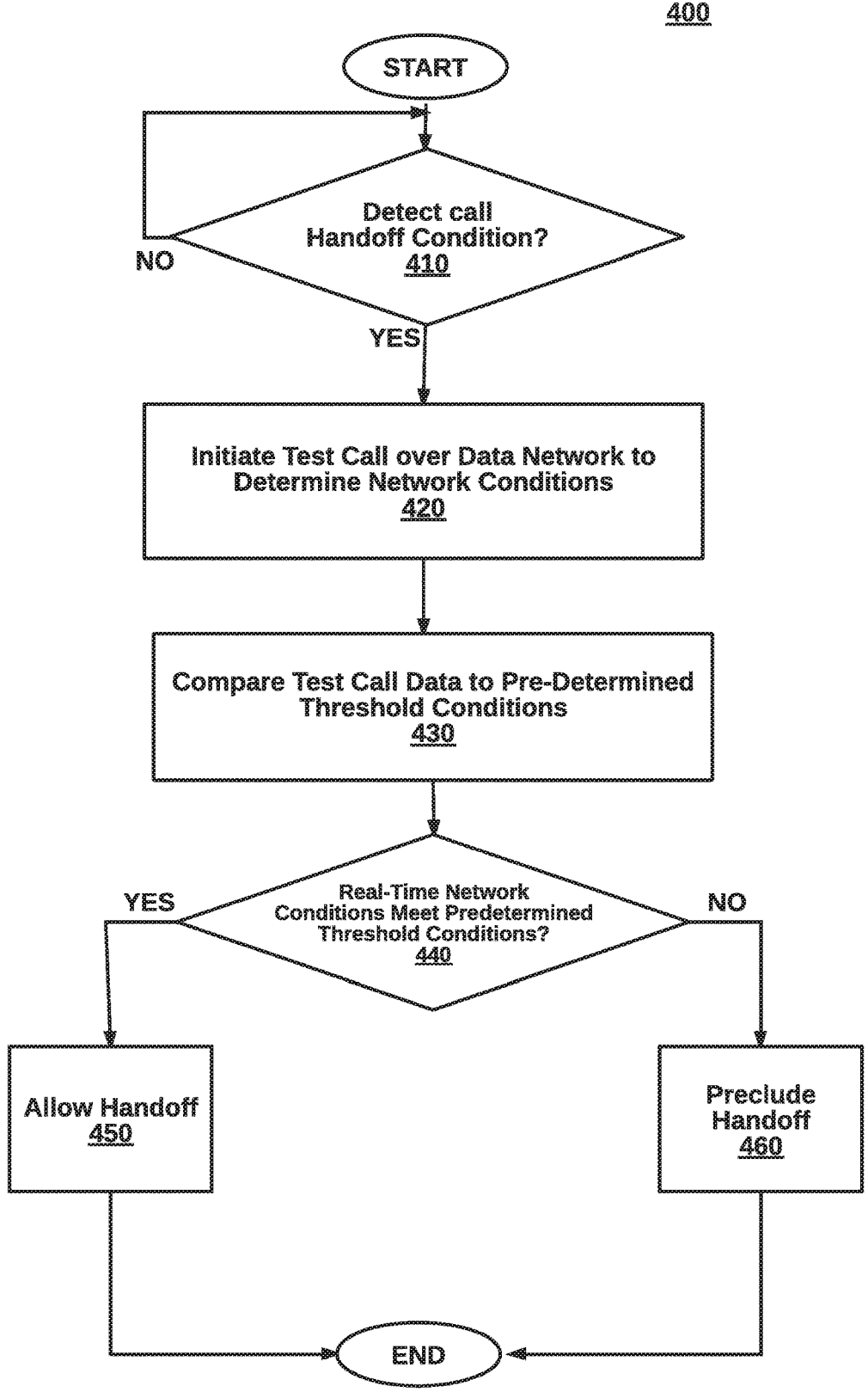
FIG. 4 is a more detailed flow chart illustrating a step for using conditions from a test call prior to hand-offs from cellular networks to Wi-Fi networks of FIG. 3, according to an embodiment.

Methods for Reliable Network Hand-Offs (FIG. 3-4)

FIG. 3 is a flow chart illustrating a method 300 for reliable VOIP hand-offs from cellular networks to Wi-Fi networks, according to an embodiment. The process at a high-level is implementable by computer hardware, wherein individual components can perform individual steps of a method.

In method 300, a user is engaged in a call using a telephone device over a cellular network (step 310). Using conditions from a test call prior to handing-off the call from the cellular network to a data network (step 320), an example of which is set forth below with respect to FIG. 3. The user continues engaging in the call using the telephone device over a data network (step 330).

One of ordinary skill in the art will recognize that the method 300 (and others) is non-limiting as other embodiments can have more or less steps and can be performed in a different order. The method 300 can be implemented in the system 100 of FIG. 1 or in other components.

FIG. 4 is a flow chart illustrating the step 320 of using conditions from a test call prior to hand-offs from cellular networks to Wi-Fi networks, according to an embodiment.

Responsive to detecting a hand-off condition (step 410), a test call is initiated over a data network to determine network conditions (step 420). Test call data is compare dot pre-determined threshold conditions (step 430). If real-time network conditions meet pre-determined threshold conditions, a hand-off is allowed (step 450). If real-time network conditions to not meet pre-determined conditions, a hand-off may be precluded (sate 460). In some cases, other conditions are also taken into account.

Generic Computing Device (FIG. 5)

FIG. 5 is a block diagram illustrating an exemplary computing device 500 for use in the system 100 of FIG. 1, according to one embodiment. The computing device 500 is an exemplary device that is implementable for each of the components of the system 100, including the network hand-off controller 105, the access points 132, and the station 110. The computing device 500 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 500, of the present embodiment, includes a memory 510, a processor 520, a storage drive 530, and an I/O port 540. Each of the components is coupled for electronic communication via a bus 599. Communication can be digital and/or analog, and use any suitable protocol.

The memory 510 further comprises network applications 512 and an operating system 514. The network applications 512 can include the modules of the network hand-off controller 105, the call controller 121, the Wi-Fi controller 122, the cell tower 151 and the access point 152. Other network applications 512 can include a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 5 or Windows 8), Linux, HP-UX, UNIX, Sun OS, Solaris, Mac OS X, Alpha OS, AIX, IRIX52, or IRIX64. Other operating systems may be used. Microsoft Windows is a trademark of Microsoft Corporation.

The processor 520 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 550

The storage drive 530 can be any non-volatile type of storage such as a magnetic disc, EEPROM, Flash, or the like. The storage drive 550 stores code and data for applications.

The I/O port 540 further comprises a user interface 542 and a network interface 544. The user interface 542 can output to a display device and receive input from, for example, a keyboard. The network interface 544 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in a cloud-based network hand-off controller server for testing VOIP calls of mobile computing devices prior to executing hand-offs from a cellular network to a data communication network, the method comprising the steps of: predicting, by a processor of the network hand-off server, a hand-off condition that is indicative of a hand-off by a specific mobile computing device of a call from the cellular communication network to the data communication network during a cellular call; responsive to predicting the hand-off condition, automatically initiating, by the network hand-off controller server, a test call over the data communication network, the data communication network being external to the cellular communication network; determining, by the processor, network conditions from the test call; comparing, by the processor, at least one of the network conditions to at least one pre-determined threshold condition; detecting the hand-off condition resulting in an attempt by the specific mobile computing device to hand-off the call from the cellular communication network to the data communication network during the cellular call; responsive to the comparison, allowing, by the network hand-off controller server, the delayed hand-off of the call responsive to the at least one network conditions meeting the at least one pre-determined threshold condition; and responsive to the comparison, not allowing the hand-off of the call responsive to the network conditions failing to meet at least one of the at least one pre-determined threshold condition at a first access point, determining network conditions at a second access point, comparing at least one of the network conditions at the second access point to at least one second set of pre-determined threshold condition, and responsive to the comparison at the second access point, allowing, the hand-off of the call to the second access point responsive to the network conditions meeting the at least one second set of pre-determined threshold condition.

2. The method of claim 1, wherein the hand-off conditions include one or more of:
a request for hand-off from the mobile computing device, a predicted upcoming hand-off, a forced hand-off from a network device, a network policy, low quality of service, and an RSSI reading.

3. The method of claim 1, wherein the step of delaying the handoff comprises intercepting and delaying an explicit hand-off action until the step of allowing the hand-off.

4. The method of claim 1, wherein the network conditions include one or more of: quality of service, network policies, latency, error rate, network congestion, packet collisions, processor load, and queue capacity.

5. The method of claim 1, wherein the call initially comprises a cellular call and after the hand-off comprises a VOIP call.

6. The method of claim 1, wherein the hand-off comprises a transfer of the call from a cell tower of the cellular communication network to an access point of the data communication network.

7. A non-transitory computer-readable medium storing instructions that, when executed by a processor, perform a method in a cloud-based network hand-off controller server for testing VOIP calls of mobile computing devices prior to executing hand-offs from a cellular network to a data communication network, the method comprising the steps of: predicting, by a processor of the network hand-off server, a hand-off condition that is indicative of a hand-off by a specific mobile computing device of a call from the cellular communication network to the data communication network during a cellular call; responsive to predicting the hand-off condition, automatically initiating, by the network hand-off controller server, a test call over the data communication network, the data communication network being external to the cellular communication network; determining, by the processor, network conditions from the test call; comparing, by the processor, at least one of the network conditions to at least one pre-determined threshold condition; detecting the hand-off condition resulting in an attempt by the specific mobile computing device to hand-off the call from the cellular communication network to the data communication network during the cellular call; responsive to the comparison, allowing, by the network hand-off controller server, the delayed hand-off of the call responsive to the at least one network conditions meeting the at least one pre-determined threshold condition; and responsive to the comparison, not allowing the hand-off of the call responsive to the network conditions failing to meet at least one of the at least one pre-determined threshold condition at a first access point, determining network conditions at a second access point, comparing at least one of the network conditions at the second access point to at least one second set of pre-determined threshold condition, and responsive to the comparison at the second access point, allowing, the hand-off of the call to the second access point responsive to the network conditions meeting the at least one second set of pre-determined threshold condition.

8. The computer-readable medium of claim 7, wherein the hand-off conditions include one or more of: a request for hand-off from the telephone device, a predicted upcoming hand-off, a forced hand-off from a network device, a network policy, low quality of service, and an RSSI reading.

9. The computer-readable medium of claim 7, wherein the step of detecting the hand-off condition comprises intercepting and delaying an explicit hand-off action until the step of allowing the hand-off.

10. The computer-readable medium of claim 7, wherein the network conditions include one or more of: quality of service, network policies, latency, error rate, network congestion, packet collisions, processor load, queue capacity.

11. The computer-readable medium of claim 7, wherein the call initially comprises a cellular call and after the hand-off comprises a VOIP call.

12. The computer-readable medium of claim 7, wherein the hand-off comprises a transfer of the call from a cell tower of the cellular communication network to an access point of the data communication network.

13. The computer-readable medium of claim 7, further comprising:
responsive to the comparison, not allowing the hand-off of the call responsive to the network conditions failing to meet at least one of the at least one pre-determined threshold condition at a first access point;
determining network conditions at a second access point;
comparing at least one of the network conditions at the second access point to at least one second set of pre-determined threshold condition; and
responsive to the comparison at the second access point, allowing, by the data network interface, the hand-off of the call to the second access point responsive to the network conditions meeting the at least one second set of pre-determined threshold condition.

14. A telephone device for testing VOIP calls prior to executing hand-offs from a cellular network to a data communication network, the telephone device comprising:
a hand-off detection module, coupled to a processor, to detect a hand-off condition that is indicative of a hand-off of a call from the cellular communication network to the data communication network during a cellular call, wherein the detection comprises intercepting a command to hand-off, and wherein the hand-off detection module delays the hand off until allowed to go forward;
a test call quality module, coupled to a data network interface and the hand-off detection module to, responsive to detecting the hand-off condition, automatically initiate a test call over the data communication network, the data communication network being external to the cellular communication network, the test call quality module to determine network conditions from the test call, and the test call quality module to compare at least one of the network conditions to at least one pre-determined threshold condition; and
a radio controller, coupled to the data network interface and the test call quality module to, responsive to the comparison, allow the delayed hand-off of the call responsive to the at least one network conditions meeting the at least one pre-determined threshold condition, and
wherein the test call quality module, responsive to the comparison, not allowing the hand-off of the call responsive to the network conditions failing to meet at least one of the at least one pre-determined threshold condition at a first access point, determining network conditions at a second access point, comparing at least one of the network conditions at the second access point to at least one second set of pre-determined threshold condition, and responsive to the comparison at the second access point, allowing, by the data network interface, the hand-off of the call to the second access point responsive to the network conditions meeting the at least one second set of pre-determined threshold condition.

15. The method of claim 1, wherein the test call is initiated without knowledge of the initiation to a user of the telephone device.

16. The computer-readable medium of claim 7, wherein the test call is initiated without knowledge of the initiation to a user of the telephone device.

17. The method of claim 1, wherein a mobile application for the telephone device is implemented to optimize executing hand-offs from a cellular network to a data communication network.

18. The computer-readable medium of claim 7, wherein a mobile application for the telephone device is implemented to optimize executing hand-offs from a cellular network to a data communication network.

19. The telephone device of claim 14, wherein a mobile application for the telephone device is implemented to optimize executing hand-offs from a cellular network to a data communication network.

\* \* \* \* \*